UNITED STATES PATENT OFFICE.

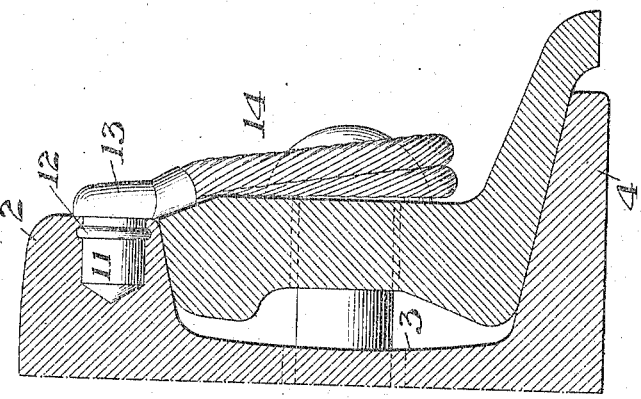
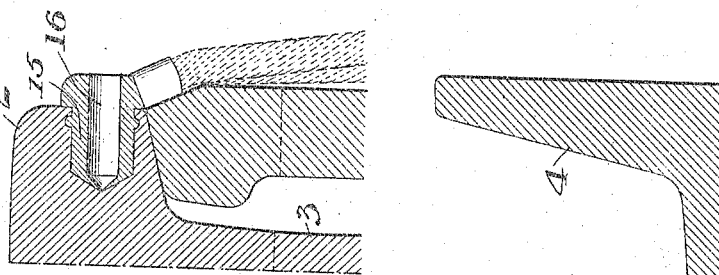
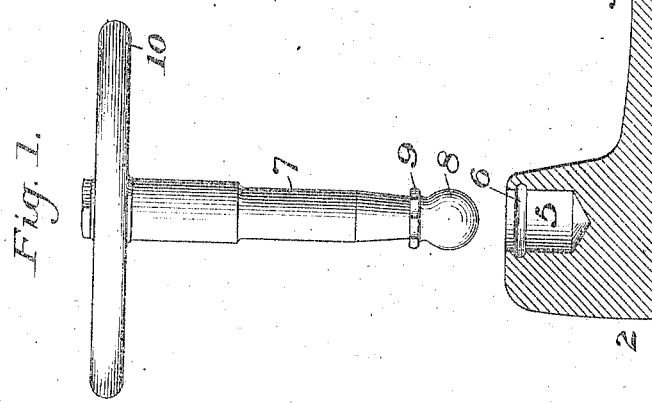

CHARLES R. STURDEVANT, OF WORCESTER, MASSACHUSETTS, ASSIGNOR TO THE AMERICAN STEEL AND WIRE COMPANY OF NEW JERSEY, OF WORCESTER, MASSACHUSETTS, A CORPORATION OF NEW JERSEY.

RAIL-BOND.

957,911.   Specification of Letters Patent.   Patented May 17, 1910.

Application filed August 23, 1906. Serial No. 331,711.

*To all whom it may concern:*

Be it known that I, CHARLES R. STURDEVANT, of Worcester, in the county of Worcester and State of Massachusetts, have invented a new and Improved Rail-Bond, of which the following is a specification, reference being had to the accompanying drawing, in which—

Figure 1 shows a partial section of a rail with side elevation of the milling cutter employed therewith; and Figs. 2 and 3 are partial sections showing two forms of the rail bond in place.

My invention relates to terminal stud bonds applied to railway rails for the purpose of conducting an electric current; and the object of the invention is to provide a new and improved structure by which the studs are firmly anchored in position, and further to permanently seal the contact and prevent the entrance of air or moisture.

To that end, the invention consists in providing a bottomed hole having one or more annular grooves in its wall, into which annular groove or grooves the metal of the stud is forced or expanded.

It further consists in the construction and arrangement of parts as hereinafter more fully described and set forth, and also in the method of forming the bond.

In the drawings, referring to Fig. 1, 2 represents a part of the head, 3 the web and 4 the base flange of an ordinary T-rail, the head being provided with a bottomed hole 5. The inner end of the hole is preferably conical, though it may be of any desired form. Near the outer portion of the hole, I cut or form an annular groove 6 in its wall; and for this purpose I preferably employ the hand milling cutter shown in Fig. 1. This cutter may consist of a stem 7 having a ball-shaped end 8 and a toothed cutter 9, the stem being provided with a hand-wheel 10. By inserting the bell-shaped end of the stem in the hole and rotating the outer end of the stem about the axis of the hole, and turning the hand-wheel, the groove 6 may be cut in the wall of the hole. If a solid stud of copper or other suitable metal is inserted endwise into the hole, this may be driven or compressed so as to expand the metal of the stud and force it into the annular groove 6. Such a form is shown in Fig. 2, where 11 represents the stud, which is expanded at 12 in annular form to fill the groove in the wall of the hole. One or more studs may be employed for each terminal 13, the terminals being preferably connected by the flexible member or members 14.

Instead of using a solid stud which is driven or forced inwardly to expand it into the groove, I may expand a tubular stud by driving a pin of steel or other suitable metal thereinto. Thus, in Fig. 3 I show the tubular stud 15 as being expanded by a pin 16 driven into it as shown in dotted lines. This pin will expand the copper of the stud to fill the groove.

The advantages of my invention result from the use of the annular recess or groove in the wall of the hole, which may be formed either by the hand milling cutter shown, or by an expansion bit, or other suitable tool. The expanding of the stud into this groove anchors the stud firmly in place and furthermore, being preferably near the outer end of the hole, serves to seal the contact permanently from the entrance of air or moisture which would tend to corrode the joint and reduce its conductivity. The provision of the bottomed hole for the studs not only results in the exclusion of moisture which might destroy perfect contact between the surfaces, but the bottoming wall also acts as a backing or anvil which insures proper expansion of the stud.

Many changes may be made in the form and size of the hole and the annular groove or recess; and also in the form of the stud and connector without departing from my invention.

I claim:

1. A rail having a bottomed hole therein with an annular groove or recess in its wall for receiving a terminal stud, the bottom wall of the hole forming a backing, or anvil surface for the end of the stud, and also excluding moisture therefrom, substantially as described.

2. A rail having a bottomed hole therein with an annular groove or recess in the wall of the hole, and a terminal stud expanded within the groove of the hole, the bottom wall of the hole protecting the stud and also forming an anvil or backing therefor, substantially as described.

3. A rail having a bottomed hole with an annular groove in its wall near the outer end of the hole, in combination with a terminal stud expanded in the hole and within the annular recess, the wall of the hole being in contact with the surface of the stud at its inner end, substantially as described.

4. In a rail bond, the combination with a rail having a bottomed hole therein, formed with an annular groove in its wall near its outer end, of a terminal stud seated in the said hole and having a portion thereof expanded into the annular groove and forming combined sealing and anchoring means for the stud; substantially as described.

5. In a device of the class described, the combination of a rail provided with a cavity having an end wall, the diameter of the cavity being larger intermediate its ends, a bond, and a projection carried thereby, said projection entering into the cavity and upset therein to substantially conform to the contour of said cavity.

6. In a device of the class described, the combination of a rail, provided with a cavity having an end wall, the diameter of a portion of the cavity beyond the entrance being increased, a bond, and a projection carried by the bond, said projection being of a length greater than the depth of the cavity, the end of the projection engaging the wall and said projection being enlarged in diameter to conform to the contour of the cavity.

7. In a device of the class described, the combination of a rail, provided with a cavity having an end wall, said cavity being of irregular diameter, the entrance thereof being of the smallest diameter, a bond, and a projection carried thereby, said projection being of a length greater than the depth of the cavity, the end of the projection engaging the said wall and the projection being forced into the cavity, whereby the diameter of its body is enlarged to conform to the greater diameter of the cavity.

8. A rail having a bottomed hole therein for receiving a terminal stud, the bottom of the hole forming a backing or anvil surface for the end of the stud and also excluding moisture therefrom, and the diameter of the hole being larger intermediate its ends, substantially as described.

9. A rail having a bottomed hole therein for receiving a terminal stud, the bottom of the hole forming a backing or anvil surface for the end of the stud and also excluding moisture therefrom, the diameter of a portion of the hole beyond the entrance being increased, substantially as described.

10. A rail having a bottomed hole therein for receiving a terminal stud, the bottom of the hole forming a backing or anvil surface for the end of the stud and also excluding moisture therefrom, said hole being of irregular diameter with the entrance thereof of the smallest diameter.

In testimony whereof, I have hereunto set my hand.

CHARLES R. STURDEVANT.

Witnesses:
 FRANK F. DRESSER,
 CHARLES A. HAMILTON.